(12) United States Patent
Kim et al.

(10) Patent No.: US 11,631,846 B2
(45) Date of Patent: Apr. 18, 2023

(54) BATTERY CELL, SECONDARY BATTERY, AND METHOD OF MANUFACTURING BATTERY CELL

(71) Applicant: LG CHEM, LTD., Seoul (KR)

(72) Inventors: Ilhong Kim, Daejeon (KR); Gisu Jeong, Daejeon (KR); Seok Koo Kim, Daejeon (KR)

(73) Assignee: LG ENERGY SOLUTIONS, LTD., Seoul (KR)

( * ) Notice: Subject to any disclaimer, the term of this patent is extended or adjusted under 35 U.S.C. 154(b) by 179 days.

(21) Appl. No.: 16/771,088

(22) PCT Filed: Feb. 21, 2019

(86) PCT No.: PCT/KR2019/002147
§ 371 (c)(1),
(2) Date: Jun. 9, 2020

(87) PCT Pub. No.: WO2019/235719
PCT Pub. Date: Dec. 12, 2019

(65) Prior Publication Data
US 2021/0193997 A1  Jun. 24, 2021

(30) Foreign Application Priority Data
Jun. 4, 2018  (KR) ......................... 10-2018-0064314

(51) Int. Cl.
*H01M 4/38* (2006.01)
*H01M 4/587* (2010.01)
(Continued)

(52) U.S. Cl.
CPC ........... *H01M 4/386* (2013.01); *H01M 4/587* (2013.01); *H01M 10/04* (2013.01);
(Continued)

(58) Field of Classification Search
CPC ...... H01M 4/386; H01M 4/587; H01M 10/04; H01M 10/445; H01M 2004/021; H01M 2004/027; H01M 2004/02
See application file for complete search history.

(56) References Cited

U.S. PATENT DOCUMENTS 5,635,817 A    6/1997  Shiska
9,500,713 B1 *  11/2016 Ghantous .......... G01R 31/3835
(Continued)

FOREIGN PATENT DOCUMENTS

| CN | 103633265 A | 3/2014 |
| CN | 103782420 A | 5/2014 |

(Continued)

OTHER PUBLICATIONS

English machine translation of Park et al. (KR 20150050223 A) (Year: 2015).*

(Continued)

*Primary Examiner* — Brian R Ohara
*Assistant Examiner* — Aaron J Salter
(74) *Attorney, Agent, or Firm* — Birch, Stewart, Kolasch & Birch, LLP (57) ABSTRACT

A battery cell includes a positive electrode, a negative electrode, and a separation film provided between the positive electrode and the negative electrode. A variation ratio of thickness of a battery cell before a pressurizing jig is disconnected and after the pressurizing jig is disconnected is equal to or less than 0.009, and the variation ratio of thickness of a battery cell is defied by a value generated by dividing a variation value of thickness that is a difference between the thickness of a battery cell after the pressurizing jig is disconnected and the thickness of a battery cell before the pressurizing jig is disconnected by the thickness of a battery cell before the pressurizing jig is disconnected.

7 Claims, 11 Drawing Sheets

(51) Int. Cl.
  *H01M 10/04* (2006.01)
  *H01M 10/44* (2006.01)
  *H01M 4/02* (2006.01)

(52) U.S. Cl.
  CPC .... *H01M 10/445* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 10,184,778 B2 | 1/2019 | Yoon et al. |
| 2012/0135312 A1 | 5/2012 | Takahashi |
| 2013/0337325 A1 | 12/2013 | Jung et al. |
| 2014/0178720 A1 | 6/2014 | Rentzsch et al. |
| 2016/0141626 A1 | 5/2016 | Hosaka et al. |
| 2016/0336592 A1 | 11/2016 | Hirose et al. |
| 2017/0074634 A1 | 3/2017 | Yoon et al. |
| 2017/0250443 A1* | 8/2017 | Shatunov .......... H01M 10/0525 |
| 2017/0317376 A1 | 11/2017 | Yoon et al. |
| 2018/0115015 A1 | 4/2018 | Inoue et al. |
| 2018/0294510 A1* | 10/2018 | Kitaura ............... H01M 10/052 |

FOREIGN PATENT DOCUMENTS

| | | | |
|---|---|---|---|
| CN | 107431234 A | 12/2017 | |
| JP | 2012-84322 A | 4/2012 | |
| JP | 2012-255763 A | 12/2012 | |
| JP | 2014-35987 A | 2/2014 | |
| JP | 2014-127341 A | 7/2014 | |
| KR | 10-2012-0046253 A | 5/2012 | |
| KR | 10-2013-0126365 A | 11/2013 | |
| KR | 10-2014-0034811 A | 3/2014 | |
| KR | 10-2014-0139356 A | 12/2014 | |
| KR | 20150050223 A * | 5/2015 | .......... H01M 50/578 |
| KR | 10-2816-0010122 A | 1/2016 | |
| KR | 10-2016-0056207 A | 5/2016 | |
| KR | 10-2016-0063278 A | 6/2016 | |
| KR | 10-2017-0094669 A | 8/2017 | |
| KR | 10-2017-0100971 A | 9/2017 | |
| KR | 10-1783923 B1 | 10/2017 | |
| WO | WO 2014/200003 A1 | 12/2014 | |
| WO | WO 2015/118593 A1 | 8/2015 | |
| WO | WO 2017/065586 A1 | 4/2017 | |

OTHER PUBLICATIONS

International Search Report (PCT/ISA/210) issued in PCT/KR2019/002147 dated Jun. 11, 2019.

* cited by examiner

BATTERY CELL, SECONDARY BATTERY, AND METHOD OF MANUFACTURING BATTERY CELL

TECHNICAL FIELD

Cross-Reference to Related Application

This application claims priority to and the benefit of Korean Patent Application No. 10-2018-0064314 filed in the Korean Intellectual Property Office on Jun. 4, 2018, the entire contents of which are incorporated herein by reference.

The present invention relates to a battery cell, a secondary battery, and a method for manufacturing a battery cell.

BACKGROUND ART

A secondary battery may be classified into a can-type secondary battery in which an electrode assembly is installed in a cylindrical or square-shaped metal can, and a pouch-type secondary battery in which an electrode assembly is installed in a pouch of an aluminum laminate sheet.

Particularly, the pouch-type secondary battery uses a pouch case made of a soft sheet material, so it is possible to generate product forms in various ways and manufacture the same in a small size because of its characteristics.

In general, the pouch-type secondary battery may be manufactured through a cell assembling process and a cell activating process. A battery activation process stabilizes a battery structure and allows the same to be usable through a process for charging, aging, and discharging the assembled battery. In the battery activation process, a cell is mounted on a predetermined pressurizing jig for fluent conductivity of current, and a charging and discharging process is performed in a necessary condition for activating the battery. The pressurizing jig is also used to test performance of the manufactured secondary battery in advance. Further, when the pressurizing jig is used, an increase of a thickness of the cell may be prevented and applying of bad influence to the cell performance may be reduced.

However, when the cell is supplied or is needed to be mounted on a module after the battery activation using a pressurizing jig finishes in the process step, the pressurizing jig must be disconnected. The cell thickness that is suppressed by use of a pressurizing jig generates a pop-up phenomenon when the pressurizing jig is disconnected, thus substantially increasing the cell thickness. Energy density may be improved when the pop-up phenomenon of the cell thickness is suppressed after the process using a pressurizing jig.

DISCLOSURE

Technical Problem

The present invention has been made in an effort to provide a battery cell, a secondary battery, and a method for manufacturing a battery cell for improving energy density by specifying a point of time when a pressurizing jig is disconnected before a battery cell is shipped or a battery cell is mounted on a battery module.

Technical Solution

However, tasks to be solved by exemplary embodiments of the present invention may not be limited to the above-described task, and may be extended in various ways within a range of technical scopes included in the present invention.

An exemplary embodiment of the present invention provides a battery cell including a positive electrode, a negative electrode, and a separation film provided between the positive electrode and the negative electrode, wherein a variation ratio of thickness of the battery cell before a pressurizing jig is disconnected from the battery cell and after the pressurizing jig is disconnected from the battery is equal to or less than 0.009, and the variation ratio of thickness of the battery cell is defined by a value generated by dividing a variation value of thickness that is a difference between a thickness of a battery cell after the pressurizing jig is disconnected from the battery cell and a thickness of the battery cell before the pressurizing jig is disconnected from the battery cell by the thickness of the battery cell before the pressurizing jig is disconnected from the battery cell.

The negative electrode may include a negative active material including a silicon-based active material and a graphite active material.

The silicon-based active material may be SiO, Si, SiOC, or SiC.

The silicon-based active material in the negative electrode may be included at 10 wt % to 30 wt %.

When the pressurizing jig is disconnected from the battery cell, a state of charge of the battery cell may have a range that is equal to or less than 9.20% or a range of 51.65% to 79.64%.

When the pressurizing jig is disconnected from the battery cell, a state of charge of the battery cell may be 0% or 60%.

When the pressurizing jig is disconnected from the battery cell, a state of charge of the battery cell may have a range that is equal to or less than 10.83% or a range of 56.67% to 88.99%.

When the pressurizing jig is disconnected from the battery cell, a state of charge of the battery cell may be 0% or 70%.

Another embodiment of the present invention provides a secondary battery including the above-described battery cell.

Yet another embodiment of the present invention provides a method for manufacturing a battery cell an electrode assembly including a positive electrode, a negative electrode, and a separation film provided between the positive electrode and the negative electrode, the method including: using a pressurizing jig in a process for activating the battery cell: and disconnecting the pressurizing jig from the battery cell before the battery cell is mounted on a battery module, wherein a state of charge when the pressurizing jig is disconnected from the battery cell is controlled so as to adjust a difference between a thickness of the battery cell after the pressurizing jig is disconnected from the battery cell and a thickness of the battery cell before the pressurizing jig is disconnected from the battery cell.

The process for activating the battery cell may include a formation step, an aging step, a degassing step, and a charging and discharging step before disconnecting the pressurizing jig from the battery cell.

Disconnecting the pressurizing jig from the battery cell may be performed when the state of charge has a range that is equal to or less than 9.20% or a range of 51.65% to 79.64%.

Disconnecting the pressurizing jig from the battery cell may be performed when the state of charge is 0 or 60%.

Disconnecting the pressurizing jig from the battery cell may be performed when the state of charge has a range that is equal to or less than 0.83% or a range of 56.67% to 88.99%.

Disconnecting the pressurizing jig from the battery cell may be performed when the state of charge is 0% or 70%.

A negative active material included in the negative electrode may include a silicon-based active material and a graphite active material.

Disconnecting the pressurizing jig from the battery cell may be performed in the state of charge at the time when insertion of lithium ions into the silicon-based active material is completed and the lithium ions are inserted into the graphite active material.

Using the pressurizing jig in the process for activating the battery cell may be performed for the entire process for activating the battery cell or in a formation process in the process of activating the battery cell.

Using the pressurizing jig may include disposing a pair of metal plates so as to be adjacent to opposite sides of the battery cell.

Advantageous Effects

According to the exemplary embodiments, the point of time to disconnect the pressurizing jig before the battery cell is shipped or the battery cell is mounted on the battery module is specified so that the thickness variation value that is a difference between the thickness of the battery cell after the pressurizing jig is disconnected and the thickness of the battery cell before the pressurizing jig is disconnected may be equal to or less than a predetermined value, and the energy density of the battery cell and the secondary battery including the same may be improved.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Unless explicitly described to the contrary, the word "comprise" and variations such as "comprises" or "comprising" will be understood to imply the inclusion of stated elements but not the exclusion of any other elements.

Figure 1:
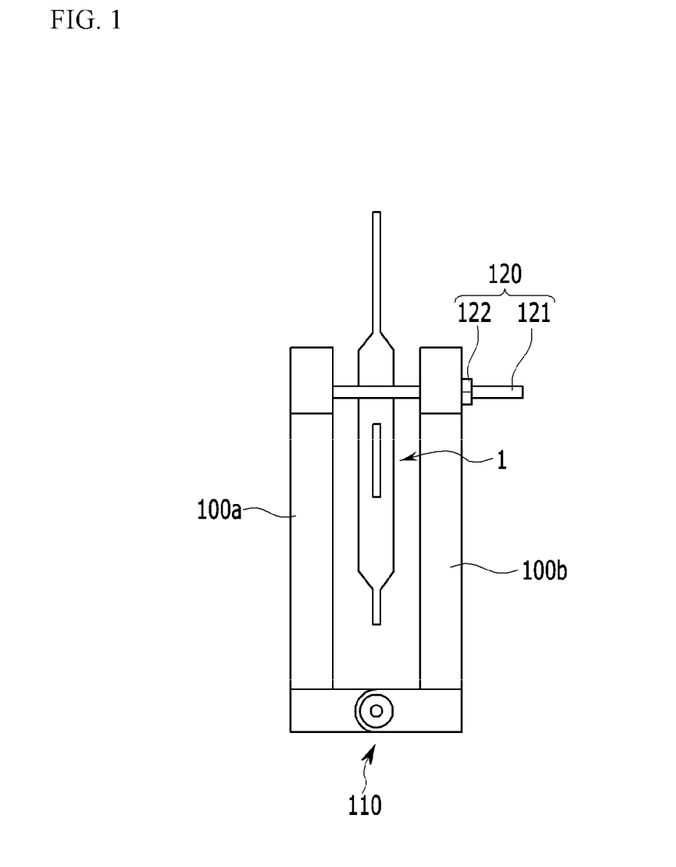
FIG. 1 shows a disposal of a battery cell to a pressurizing jig according to an exemplary embodiment of the present invention.

FIG. 1 shows a disposal of a battery cell to a pressurizing jig according to an exemplary embodiment of the present invention.

In general, a pressurizing jig may have a structure including a pair of pressurizing plates with a space in which a battery cell configuring a secondary battery is disposed, and a locking mechanism for fixing a folding state of the one pair of pressurizing plates.

Referring to FIG. 1, the pressurizing jig includes a pair of pressurizing plates 100a and 100b hinge-combined to be foldable, and a locking mechanism 120 for fixing a folding state of the one pair of pressurizing plates 100a and 100b. The one pair of pressurizing plates 100a and 100b may be hinge-combined to be mutually foldable by a hinge member 110 provided on a bottom edge. While the one pair of pressurizing plates 100a and 100b are folded, a space in which the battery cell 1 is disposed is formed between the pressurizing plates 100a and 100b. Regarding an internal width in which the battery cell 1 is disposed, that is, a gap between the pressurizing plates 100a and 100b, an increase of the thickness of the battery cell 1 may be limited within a range when the battery cell 1 is activated.

When an injection, activation, and aging process is performed on the battery cell 1 while the battery cell 1 is disposed in the pressurizing jig and the locking mechanism 120 is locked, the battery cell 1 may expand and the thickness may increase. In this instance, the pressurizing jig includes the pair of pressurizing plates 100a and 100b disposed to face respective sides of the battery cell 1, so the increase of the thickness of the battery cell 1 is limited by the pressurizing plates 100a and 100b.

The above-described configuration of the pressurizing jig is an example, and the form of the pressurizing jig is modifiable in various ways when one pair of pressurizing plates 100a and 100b and a member for combining them are provided.

The battery cell 1 according to the present exemplary embodiment includes an electrode assembly including a positive electrode, a negative electrode, and a separation film provided therebetween. Here, the negative electrode may include a negative active material including at least one of a silicon-based active material and a graphite active material, and when the negative active material is a mixture of a graphite active material and a silicon-based active material, a content of the silicon-based active material may be 10 wt % to 30 wt %. The silicon-based active material may be SiO, Si, SiOC, or SiC, and without being limited to this, silicon-based active materials that may intercalate and discharge lithium ions that are greater in number than the carbon-based active material may be used.

Figure 2:
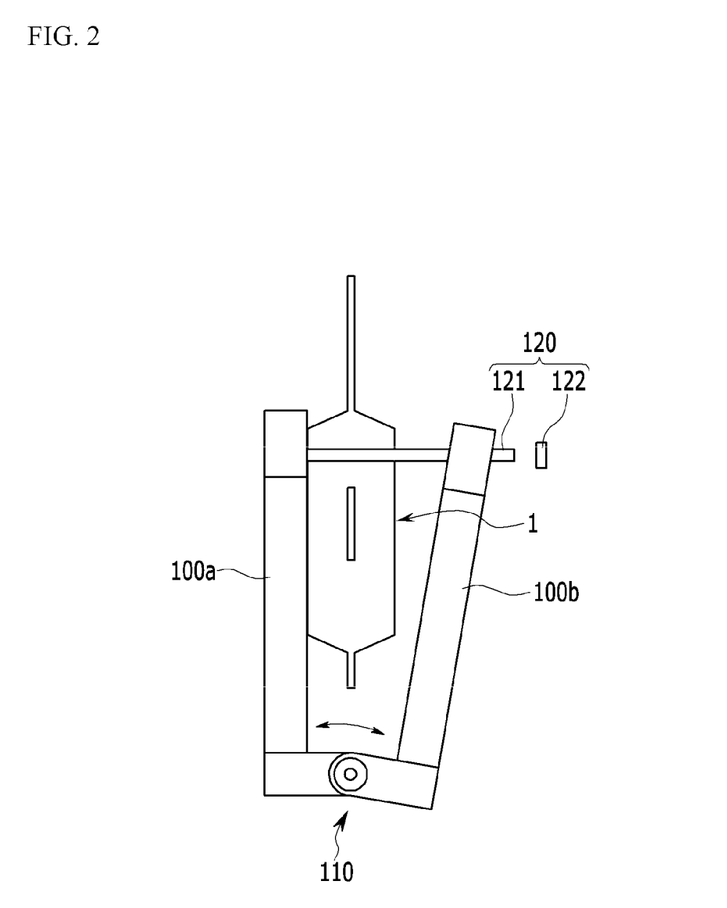
FIG. 2 shows a lateral view indicating a state in which a pressurizing jig is opened so as to separate a battery cell.

FIG. 2 shows a lateral view indicating a state in which a pressurizing jig is opened so as to separate a battery cell.

Referring to FIG. 2, the pressurizing jig is disconnected from the battery cell 1 after the activation and aging process, and in this instance, a C-type stop ring 122 is separated from a tie rod 121 to cancel a locking state of the locking mechanism 120, and the pressurizing plates 100a and 100b may be opened to separate the battery cell 1.

The negative electrode included in the battery cell according to the present exemplary embodiment may include a negative active material including a silicon-based active material and a graphite active material. When a silicon-based active material and a graphite active material are mixed and applied instead of a carbon-based negative active material as a negative active material, many more lithium ions than in the carbon-based negative active material may be intercalated and discharged, thereby improving the energy density.

However, when the silicon-based active material is used as a negative active material, the thickness of the battery cell substantially increases to degrade performance of the battery cell or reduce the energy density. To prevent the problem, the pressurizing jig may be used during the battery cell activation process, and then the increase of thickness of the battery cell that is limited by the pressurizing jig that occurs during the activation process may increase since a pop-up phenomenon is generated when the pressurizing jig is disconnected.

Therefore, to suppress the pop-up phenomenon in the present exemplary embodiment, the state of charge when the pressurizing jig is disconnected is controlled so that the ratio of thickness variation to which the difference between the thickness of the battery cell before the pressurizing jig is disconnected and the thickness of the battery cell after the pressurizing jig is disconnected is reflected may not be large. The state of charge indicates charged voltages in percentages of relative positions of the driving voltage range when a minimum value of the driving voltage of the secondary battery is 0% and a maximum value thereof is 100%. In this instance, the state of charge of the battery cell when the pressurizing jig is disconnected may be controlled to have the range that is equal to or less than 9.20% or the range of 51.65% to 79.64%. Further preferably, the state of charge of the battery cell when the pressurizing jig is disconnected may be controlled to have the range that is equal to or less than 3.27% or the range of 57.84% to 65.09%. For example, when the state of charge is 0% or 60%, the pressurizing jig may be disconnected. For another example, the step for disconnecting a pressurizing jig may be performed in the state of charge at the time when insertion of lithium ions into the silicon-based active material is finished and lithium ions are inserted into the graphite active material. In this instance, the state of charge may be about 60% when SiO is used as a silicon-based active material and the SiO is included in the negative active material at 20 wt %.

As another exemplary embodiment for controlling the state of charge of the battery cell, the state of charge of the battery cell when the pressurizing jig is disconnected may be controlled to have the range that is equal to or less than 10.83% or the range of 56.67% to 88.99%. Further preferably, the state of charge of the battery cell when the pressurizing jig is disconnected may be controlled to have the range that is equal to or less than 3.89% or the range of 66.33% to 75.23%. For example, the pressurizing jig may be disconnected when the state of charge is 0% or 70%.

For another example, the step for disconnecting a pressurizing jig may be performed in the state of charge at the time when insertion of lithium ions into the silicon-based active material is finished and lithium ions are inserted into the graphite active material. In this instance, the state of charge may be about 70% when SiO is used as a silicon-based active material and the SiO is included the negative active material at 30 wt %.

The variation ratio of thickness of the battery cell according to the present exemplary embodiment may be equal to or less than 0.009. Preferably, the variation ratio of thickness of the battery cell may be equal to or less than 0.006 or may be equal to or less than 0.004. Here, the variation ratio of thickness is defined by dividing the variation value of thickness that is a difference between the thickness of the battery cell 1 after the pressurizing jig is disconnected and the thickness of the battery cell 1 before the pressurizing jig is disconnected by a reference thickness that is the thickness of the battery cell 1 before the pressurizing jig is disconnected.

For example, the variation value of thickness of the battery cell according to the present exemplary embodiment may be equal to or less than 0.0505 millimeters (mm).

The variation value of thickness may more preferably be equal to or less than 0.023 mm or may be equal to or less than 0.019 mm.

Variations of thickness will now be described by using a battery cell manufactured through examples and comparative examples.

Example 1

Manufacturing of a Battery Cell 90 wt % of $Li_{1.5}Ni_{0.3}Mn_{0.5}Co_{0.2}O_2$ as a positive active material, 5.0 wt % of natural graphite as a conductive material, and 5.0 wt % of PVdF as a binder are put into NMP that is a solvent and they are mixed to make a positive composite, and the positive composite is coated to be 200 micrometers thick on an aluminum foil that is 20 micrometers thick, it is rolled, and it is dried to thus manufacture a positive electrode.

80 wt % of artificial graphite as a negative active material, a mixture of 20 wt % of SiO, 1.5 wt % of a conductive material (Super-P), and 3.5 wt % of a binder (PVdF) are put into NMP that is a solvent and they are mixed to make a negative composite, the negative composite is coated to be 200 micrometers thick on a copper foil that is 20 micrometers thick, it is rolled, and it is dried to manufacture a negative electrode.

A porous polyethylene separation film is provided between the positive electrode and the negative electrode, an electrolyte solution in which 1M of LiPF6 is dissolved is injected into a carbonate solvent of EC:EMC=1:2 to manufacture a battery cell used to the lithium secondary battery.

Activation Process

While the above-manufactured battery cell is disposed in the pressurizing jig, a charging process is performed for three hours in a 0.1 C condition, charging is performed at C/3 with 4.2 V after an aging process and a degassing process, and discharging at C/3 with 2.5 V is performed once. After this, charging is performed so that the battery cell may be controlled for shipping. The pressurizing jig is applied during the activation process. The range of the driving voltage of the battery cell is set to be 2.5 V to 4.2 V. The range of the driving voltage is an example, and it is changeable according to design conditions of the battery cell.

Control of the State of Charge when the Pressurizing Jig is Disconnected

The state of charge of the battery cell is set to be 0% before the pressurizing jig is disconnected after the activation process. Here, the state of charge is controlled with respect to time with the current value of C/3, and the state of charge before the pressurizing jig is disconnected is measured using cycler equipment of PNE Solution. The thickness of the battery cell before/after the pressurizing jig is disconnected is measured as follows.

The thickness before the pressurizing jig is disconnected is also measured as follows. While the pressurizing jig is disconnected for the degassing process, the battery cell is pressurized to 45 kPa for ten seconds, and the thickness of the battery cell is measured by using a compressed thickness measurer by the company of Mitutoyo. The pressurizing jig made of an aluminum plate is fastened on respective sides of the battery cell with the pressure of 45 kPa, the aluminum plate on one side is fixed on a flat surface, and a measurer for measuring displacement is installed on the aluminum plate on the opposite side. In this instance, a zero point is set, charging or discharging for a shipment is finished, the displacement is measured, and the measured displacement is applied to the thickness of the battery cell measured before the pressurizing jig is fastened to thus calculate the final thickness of the battery cell before the pressurizing jig is disconnected.

After the pressurizing jig is disconnected, pressure is applied at 45 kPa for ten seconds and the thickness is measured by using the compressed thickness measurer by Mitutoyo.

Comparative Example 1

The battery cell is manufactured in a like manner of Example 1 except that the state of charge of the battery cell is set to be 30% when the state of charge is controlled when the pressurizing jig is disconnected, in Example 1.

Example 2

The battery cell is manufactured in a like manner of Example 1 except that the state of charge of the battery cell is set to be 60% when the state of charge is controlled when the pressurizing jig is disconnected, in Example 1.

Comparative Example 2

The battery cell is manufactured in a like manner of Example 1 except that the state of charge of the battery cell is set to be 100% when the state of charge is controlled when the pressurizing jig is disconnected, in Example 1.

Figure 3:
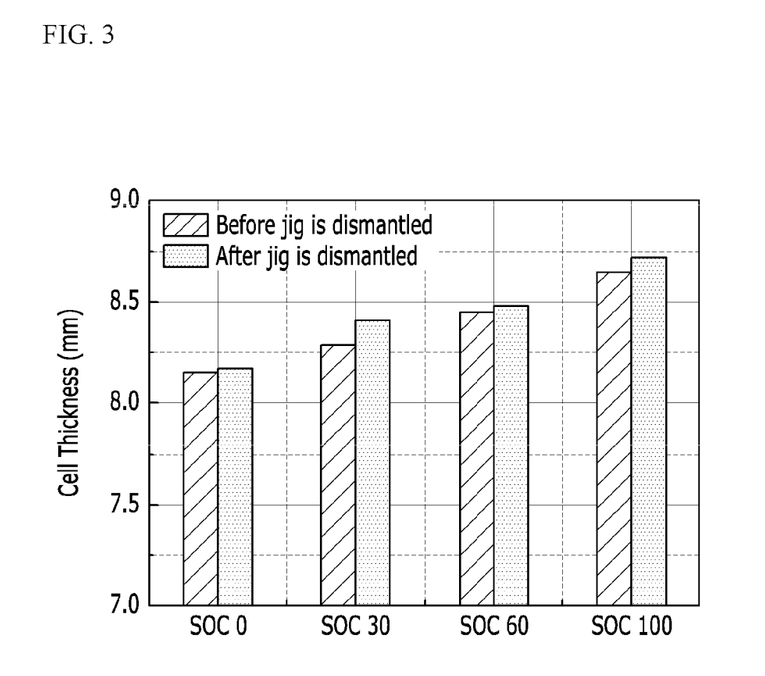
FIG. 3 shows a graph indicating respective thicknesses of a battery cell before/after a pressurizing jig is disconnected after a process for activating a battery cell when SiO 20 wt % is applied.
Figure 4:
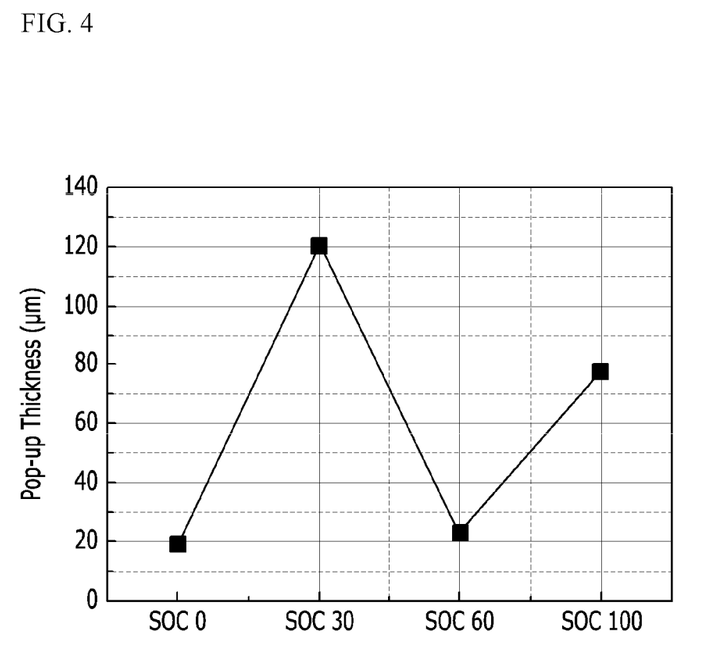
FIG. 4 shows a graph indicating variation values of thickness of a battery cell shown in FIG. 3 before/after a pressurizing jig is disconnected.

FIG. 3 shows a graph indicating respective thicknesses of a battery cell before/after a pressurizing jig is disconnected after a process for activating a battery cell when SiO at 20 wt % is applied. Table 1 given below summarizes the thickness of the battery cells shown in the graph of FIG. 3. FIG. 4 shows a graph indicating variation values of thickness of a battery cell shown in FIG. 3 before/after a pressurizing jig is disconnected.

TABLE 1

| | SOC (State of Charge) (%) | | | |
|---|---|---|---|---|
| | 0 (Example 1) | 30 (Comparative Example 1) | 60 (Example 2) | 100 (Comparative Example 2) |
| Before pressurizing jig is disconnected (mm) | 8.147 | 8.290 | 8.457 | 8.642 |
| After pressurizing jig is disconnected (mm) | 8.166 | 8.410 | 8.480 | 8.720 |

TABLE 1-continued

| | SOC (State of Charge) (%) | | | |
|---|---|---|---|---|
| | 0 (Example 1) | 30 (Comparative Example 1) | 60 (Example 2) | 100 (Comparative Example 2) |
| Thickness variation values (mm) | +0.019 | +0.120 | +0.023 | +0.078 |
| Thickness variation ratios | 0.002332 | 0.014475 | 0.002719 | 0.009025 |

Referring to FIG. 3, FIG. 4, and Table 1, the increase of thickness generated by the pop-up in the states of charge of 0% and 60% is much less than the increase of thickness generated by the pop-up in the states of charge of 30% and 100%.

Example 3

The battery cell is manufactured in a like manner of Example 1 except that a mixture of 70 wt % of artificial graphite and 30 wt % of SiO is used as a negative active material in Example 1.

Comparative Example 3

The battery cell is manufactured in a like manner of Example 3 except that the state of charge of the battery cell is set to be 30% when the state of charge is controlled in the case of disconnecting the pressurizing jig in Example 3.

Example 4

In Example 3, the battery cell is manufactured in a like manner of Example 3 except that the state of charge of the battery cell is set to be 70% when the state of charge is controlled in the case of disconnecting the pressurizing jig in Example 3.

Comparative Example 4

The battery cell is manufactured in alike manner of Example 3 except that the state of charge of the battery cell is set to be 10% when the state of charge is controlled in the case of disconnecting the pressurizing jig in Example 3.

Figure 5:
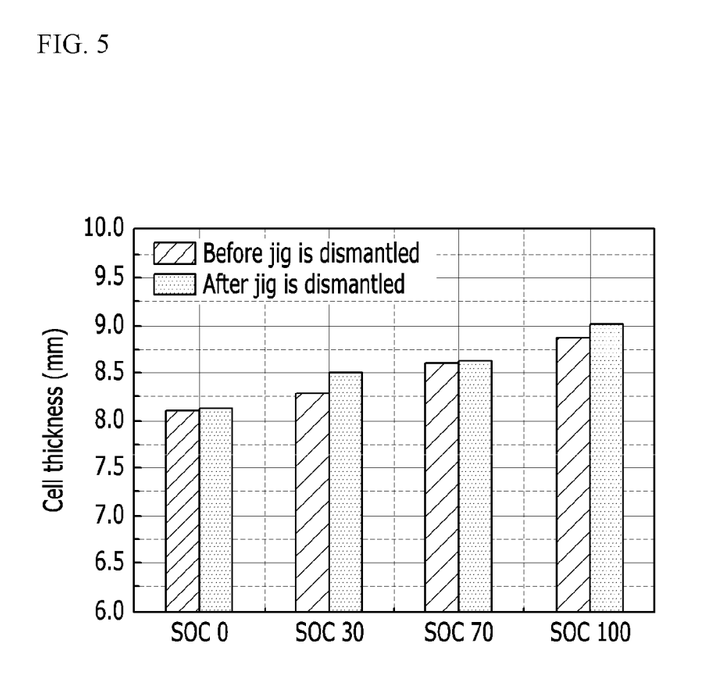
FIG. 5 shows a graph indicating thicknesses of a battery cell before/after a pressurizing jig is disconnected after a process for activating a battery cell when SiO at 30 wt % is applied.
Figure 6:
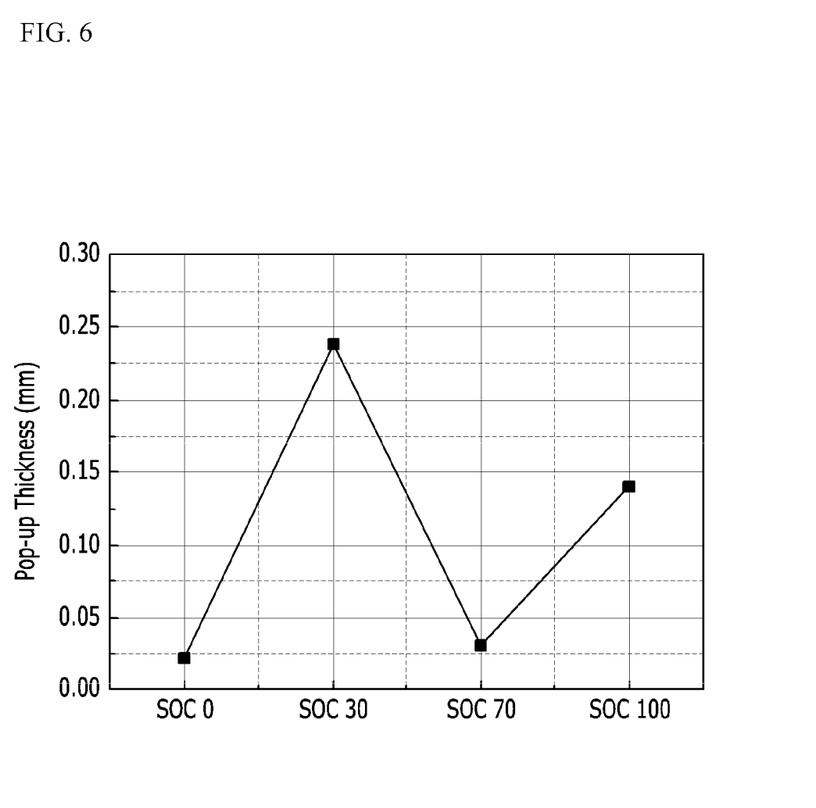
FIG. 6 shows a graph indicating variation values of thickness of a battery cell shown in FIG. 5 before/after a pressurizing jig is disconnected.

FIG. 5 shows a graph indicating thicknesses of a battery cell before/after a pressurizing jig is disconnected after a process for activating a battery cell when SiO at 30 wt % is applied. Table 2 shows a numerical summary of thicknesses of a battery cell shown in the graph of FIG. 5. FIG. 6 shows a graph indicating variation values of thickness of a battery cell shown in FIG. 5 before/after a pressurizing jig is disconnected.

TABLE 2

| | SOC (State of Charge) (%) | | | |
|---|---|---|---|---|
| | 0 (Example 3) | 30 (Comparative Example 3) | 70 (Example 4) | 100 (Comparative Example 4) |
| Before pressurizing jig is disconnected (mm) | 8.106 | 8.268 | 8.592 | 8.876 |
| After pressurizing jig is disconnected (mm) | 8.128 | 8.506 | 8.623 | 9.016 |
| Thickness variation values (mm) | +0.022 | +0.238 | +0.031 | +0.140 |
| Thickness variation ratios | 0.002714 | 0.02878 | 0.003608 | 0.0157728 |

Referring to FIG. 5, FIG. 6, and Table 2, the increase of thickness generated by the pop-up in the states of charge of 0% and 70% is much less than the increase of thickness generated by the pop-up in the states of charge of 30% and 100%.

Figure 7:
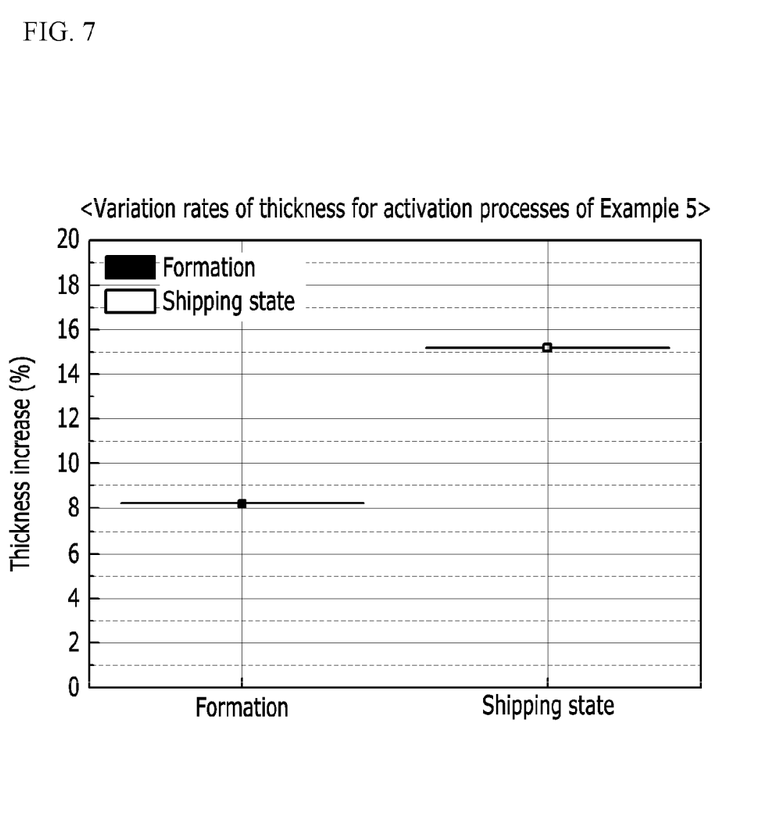
FIG. 7 shows a graph indicating ratios of variations of thickness of a battery cell according to an activation process according to a fifth exemplary embodiment.
Figure 8:
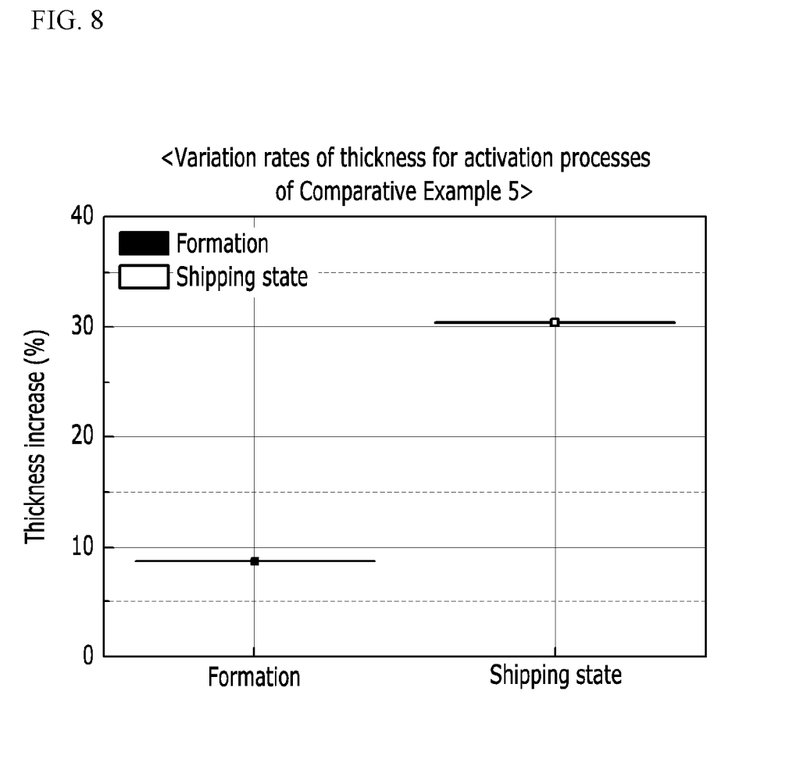
FIG. 8 shows a graph indicating ratios of variations of thickness of a battery cell according to an activation process according to a third comparative example.
Figure 9:
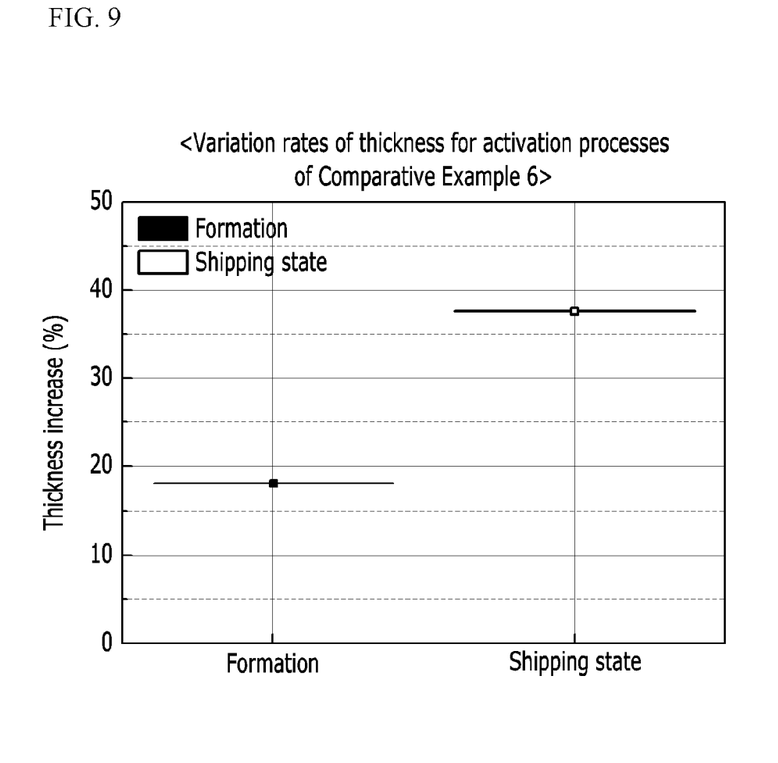
FIG. 9 shows a graph indicating ratios of variations of thickness of a battery cell according to an activation process according to a fourth comparative example.

FIG. 7 shows a graph indicating ratios of variations of thickness of a battery cell according to an activation process according to a third exemplary embodiment. In detail, it shows the increase rate of thickness of the battery cell in the formation process and the increase rate of thickness of the battery cell in the battery cell shipped state with reference to the thickness of the battery cell before the activation process is progressed. FIG. 8 shows a graph indicating ratios of variations of thickness of a battery cell according to an activation process according to a fifth comparative example. FIG. 9 shows a graph indicating ratios of variations of thickness of a battery cell according to an activation process according to a sixth comparative example.

Example 5 has a pressurizing jig applied in the entire activation process as described in Example 1, Comparative Example 5 is mostly equivalent to Example 1, but it does not apply the pressurizing jig to the entire activation process but applies it to the formation step which is part of the activation process, and Comparative Example 6 shows a case in which the pressurizing jig is not used in the battery activation process.

The formation step is a step for partly performing charging and discharging, and forming a solid electrolyte phase (SEI) film on the negative electrode surface so as to activate the battery, and in general, it may be performed by repeating charging and discharging with a predetermined range of a constant current or a constant voltage.

A battery activation process according to the present exemplary embodiment will now be described.

The battery activation process represents a step for allowing a battery cell including an electrode assembly configured with a positive electrode, a negative electrode, and a separation film, and formed through an assembling process to actually function as a battery. In detail, the process injects an electrolyte solution to an electrode assembly formed through an assembling process, undergoes an impregnating step, and performs a formation step. The process then performs an aging step, performs a degassing step, and performs a step for charging and discharging the battery cell before shipping the battery cell. Here, the aging step is to store for a predetermined time in determined temperature and moisture conditions, and through this step, the electrolyte solution is sufficiently dispersed in the battery so that movement of ions may be optimized. The degassing step may additionally remove gas generated after the formation step to reduce a swelling phenomenon, and improve a charging and discharging characteristic, a lifespan characteristic, and a temperature characteristic.

Referring to FIG. 7 through FIG. 9, the variation ratio of thickness of the battery cell in Example 5 is determined to be less than in Comparative Example 5 and in Comparative Example 6 by more than twice, and as a result, the increase of thickness of the battery cell may be minimized when the pressurizing jig is used and when the pressurizing jig is used in the battery activation process. It becomes possible to mount the battery cell in the battery module by minimizing the increase of thickness of the battery cell.

Figure 10:
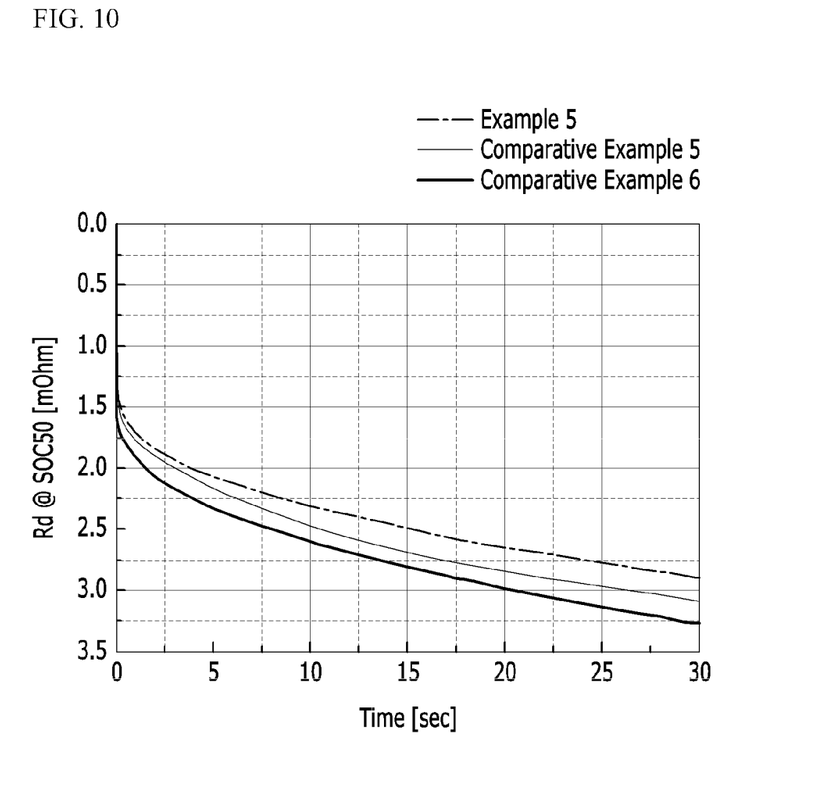
FIG. 10 shows a graph of measuring resistance of a battery cell with respect to time after an activation process.
Figure 11:
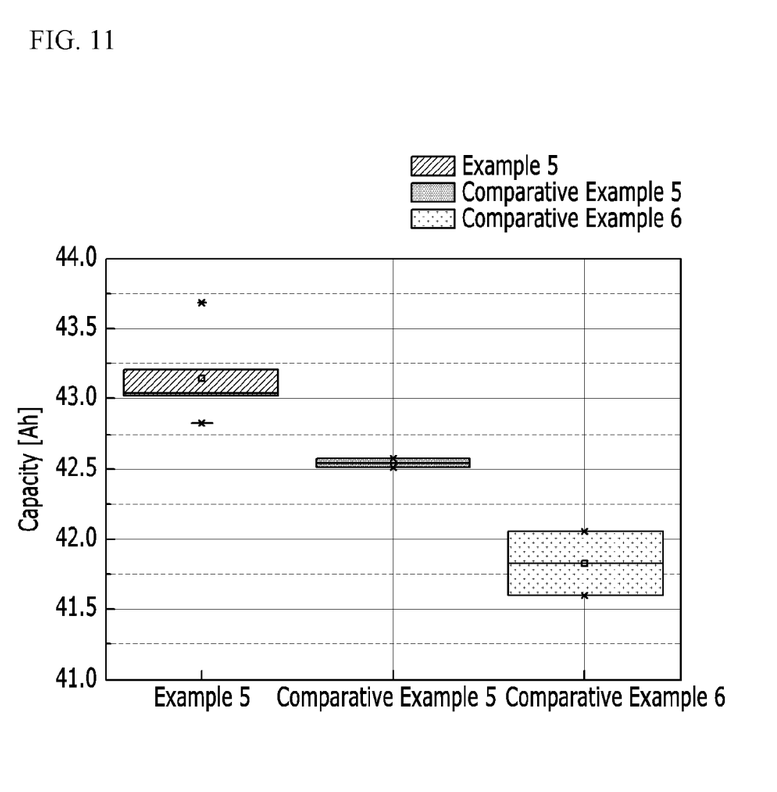
FIG. 11 shows a graph of measuring capacity of a battery cell after an activation process.

FIG. 10 shows a graph of measuring resistance of a battery cell with respect to time after an activation process. FIG. 11 shows a graph of measuring capacity of a battery cell after an activation process.

Referring to FIG. 10 and FIG. 11, reduction of resistance of the battery cell with respect to time is less and capacity of the cell is large in the case of Example 5, compared to Comparative Example 5 and Comparative Example 6, so the cell characteristic is determined to have been improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: battery cell
100a, 100b: pressurizing plate
110: hinge member
120: locking mechanism

The invention claimed is:

1. A battery cell comprising an electrode assembly including a positive electrode, a negative electrode, and a separation film provided between the positive electrode and the negative electrode, wherein
   a variation ratio of thickness of the battery cell before a pressurizing jig is disconnected from the battery cell and after the pressurizing jig is disconnected from the battery cell is equal to or less than 0.009, and the variation ratio of thickness of the battery cell is defined by a value generated by dividing a variation value of thickness that is a difference between a thickness of the battery cell after the pressurizing jig is disconnected from the battery cell and a thickness of the battery cell before the pressurizing jig is disconnected from the battery cell by the thickness of the battery cell before the pressurizing jig is disconnected from the battery cell, and
   when the pressurizing jig is disconnected from the battery cell, a state of charge of the battery cell has a range that is equal to or less than 10.83% or a range of 51.65% to 88.99%.

2. The battery cell of claim 1, wherein
   the negative electrode comprises a negative active material comprising a silicon-based active material and a graphite active material.

3. The battery cell of claim 2, wherein the silicon-based active material comprises SiO, Si, SiOC, or SiC.

4. The battery cell of claim 3, wherein the silicon-based active material in the negative electrode is included at 10 wt % to 30 wt %.

5. The battery cell of claim 1, wherein when the pressurizing jig is disconnected from the battery cell, a state of charge of the battery cell is 0% or 60%.

6. The battery cell of claim 1, wherein when the pressurizing jig is disconnected from the battery cell, a state of charge of the battery cell is 0% or 70%.

7. A secondary battery comprising the battery cell of claim 1.

* * * * *